INVENTOR.
Eric M. Woock
BY
Webster & Webster
ATTYS.

May 10, 1966  E. M. WOOCK  3,250,250
LIVE POULTRY GUARD UNIT FOR CONTINUOUS
POULTRY FEEDING TROUGHS
Filed May 11, 1962  2 Sheets-Sheet 2
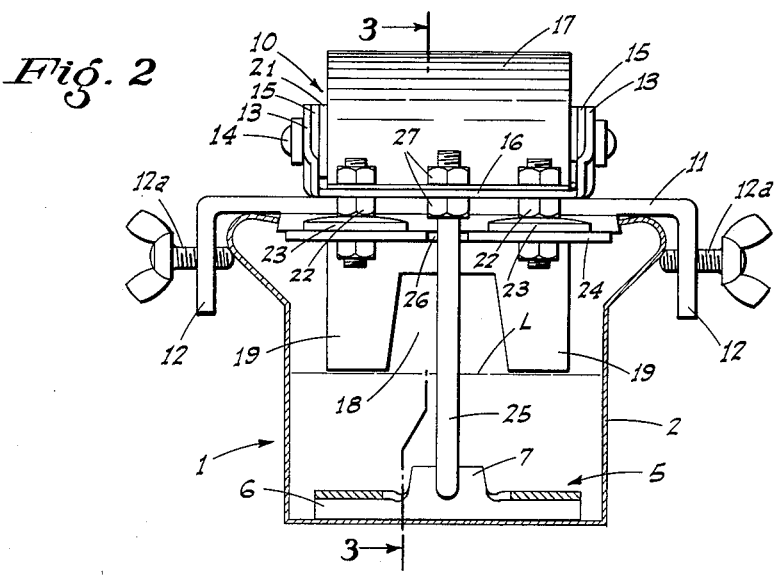
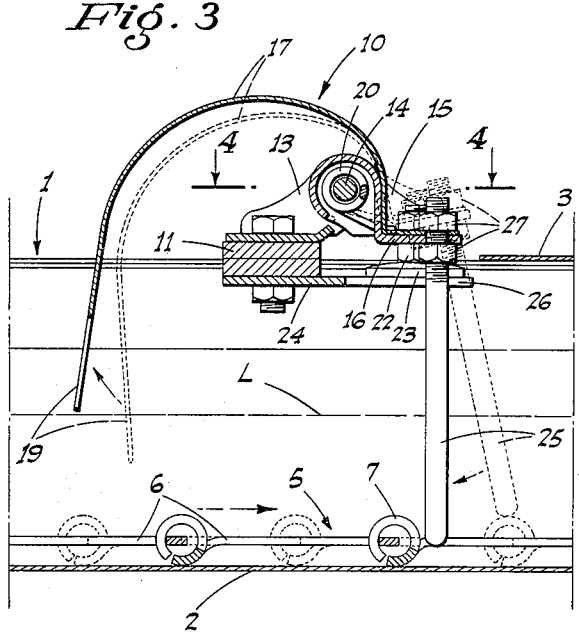
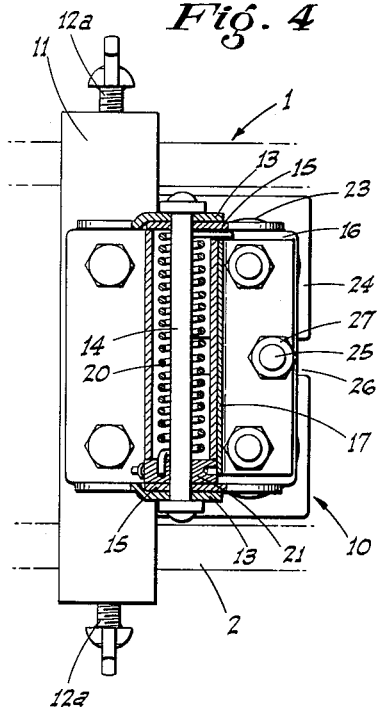

United States Patent Office 3,250,250
Patented May 10, 1966

3,250,250
LIVE POULTRY GUARD UNIT FOR CONTINUOUS
POULTRY FEEDING TROUGHS
Eric M. Woock, 1405 E. Kettleman, Lodi, Calif.
Filed May 11, 1962, Ser. No. 194,051
10 Claims. (Cl. 119—52)

This invention relates to poultry guard attachments for automatic or continuous poultry feeding devices of a certain type which is now in general use in the industry. Such device includes an open trough section into which the chickens or other poultry may dip their heads and bills, a chain immersed in the feed in the trough and traveling along the same in one direction, and a housed direction-changing pulley or sprocket at the forward end of the trough section about which the chain passes into the next trough section.

It has been found, with such a feeding device, that the chickens tend to follow the feed as it is advanced by the chain and moved through the housing, so that their bills or heads finally project into the pulley housing and are liable to be caught between the chain and pulley, with frequently fatal results.

It is therefore the principal object of my invention to provide a guard unit arranged to be mounted on the trough immediately ahead of the housing, and which will positively knock or scare the chickens away from the immediate vicinity of the housing, so that no harm can befall them. At the same time, the guard offers no interference to the flow of feed along the trough section and through the housing into the adjacent trough section, but instead helps to maintain the feed in a level and properly broken-up condition.

A further object of the invention is to provide a guard unit for the purpose so constructed that it may be easily and quickly removed from the feeding device when necessary, and no changes in or additions to the device are required to adapt the guard unit thereto.

It is also an object of the invention to provide a guard unit for continuous poultry feeding troughs which is designed for ease and economy of manufacture.

These objects are accomplished by means of such structure and relative arrangement of parts as will fully appear by a perusal of the following specification and claims.

In the drawings:

FIG. 2 is an enlarged cross section taken on line 2—2 of FIG. 1.

FIG. 3 is a sectional elevation of a guard unit as mounted on the feed trough, and taken on line 3—3 of FIG. 2.

FIG. 4 is a sectional plan of the guard unit, taken on line 4—4 of FIG. 3.

Figure 1:
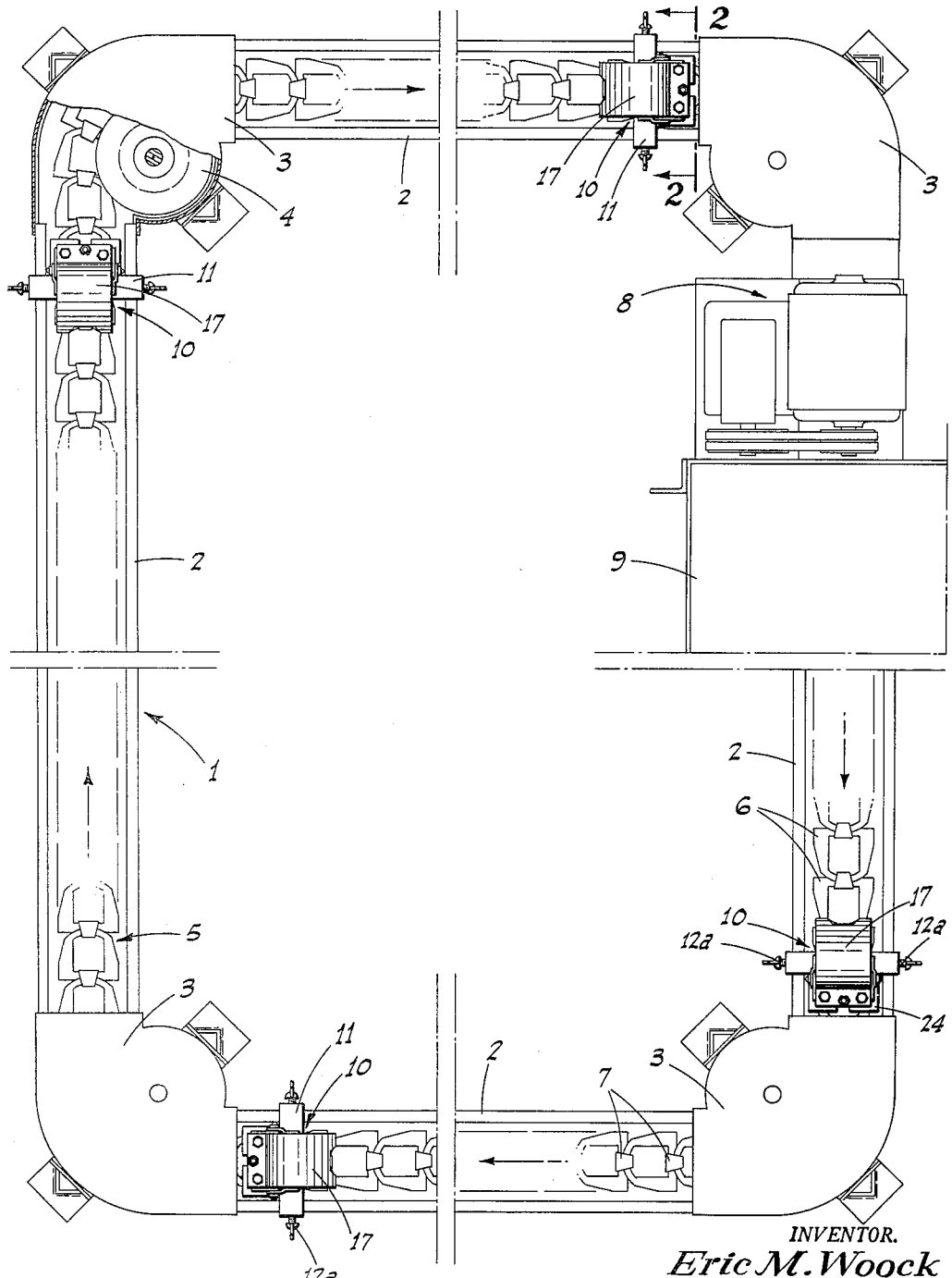
FIG. 1 is a foreshortened plan outline of an endless rectangular poultry feeding trough assembly, showing my improved guard units mounted thereon.

Referring now more particularly to the drawings, and to the characters of reference marked thereon, the continuous feed trough assembly for which the guard units have been particularly designed is of a conventional type now on the market, and is indicated generally at 1. This assembly 1 comprises a plurality of open-topped trough sections 2 arranged in parallel relation in the form of spaced opposed pairs, connected at their adjacent ends by covered corner housings 3 in which vertical-axis pulleys 4 are mounted.

An endless feed advancing and agitating chain 5 of special contsruction is mounted in the trough assembly at the bottom thereof, and is trained about the various sprockets or pulleys 4 in the corner housings 3, as indicated in FIG. 1.

The individual links 6 of the chain, and which links are relatively long, are connected together at their ends by centrally located transverse-axis circular connectors 7, which project above the links themselves, as shown in FIGS. 2 and 3. The chain is driven in one direction by means of a motor and a gear box unit, indicated generally at 8, and a hopper 9 to receive the supply of feed to be supplied to the trough unit is mounted in overlying relation to one of the lengths of trough 2, as indicated in FIG. 1.

All of the above described features are part of, and common to, the conventional feed assembly to which the guard units which form the subject of this invention are applied.

Such guard units, of which there are four in the present instance, are indicated generally at 10, and are mounted on the various lengths of trough 2 at the entry ends of the corner housings 3 of the assembly 1, with relation to the direction of movement of the chain. Since these units 10 are all identical, a description of one thereof will suffice for all.

Each unit 10 comprises a rigid cross bar 11 which straddles and rests on the trough 2, and is provided with down-turned end ears 12 in which set screws 12a are mounted; said set screws engaging the sides of the trough 2 in holding relation, as shown in FIG. 2. Secured on and upstanding from bar 11 are transversely spaced bracket ears 13 which support a transverse hinge pin 14. Turnable on the pin 14 between and adjacent ears 13 are other ears 15 connected by and rigid with a transverse horizontal plate 16, which projects forwardly relative to the pin 14 and bar 11.

A guard shield 17 (which also forms a kicker member) is secured at one end on the plate 16 and extends thence upwardly and rearwardly in arching relation with a curving contour over and clear of the hinge pin 14 and the bar 11, and then extends straight down to a termination just short of the normal level of the feed in the trough 2, as indicated at L in FIG. 3. The width of the shield approaches that of the trough 2, and its lower rear end portion is cut away between its side edges, as shown at 18 in FIG. 2, so as to leave relatively narrow feet 19 at the sides of the shield.

A helical torsion spring 20 surrounds the pin 14 between the ears 15; said spring being engaged at one end with the plate 16 and at the other end to a torsion adjusting member 21 mounted on the pin 14. The spring is arranged to lower the plate 16 while raising the shield 17, such movement being limited or prevented by the engagement of nuts 22 on the under side of plate 16 with rubber or similar cushion pads 23 mounted on another plate 24 secured on and projecting forwardly from the under side of bar 11. A rigid rod 25 is secured on and depends from plate 16 centrally of its width, said rod depending through a slot 26 in plate 24 to a lower end termination below the top of the link connectors 7, as shown. The rod is rigidly secured to the plate 16, and for vertical adjustment relative thereto, by means of nuts 27 threaded onto the rod on opposite sides of the plate and engaging the same.

In operation, with the chain constantly moving in the direction indicated, the feed in the trough tends to move therewith in the same direction. As stated in the preamble, the chickens feeding at the trough tend to follow the moving feed, and ultimately get their heads in a housing 3, where they are liable to get caught between the chain and the related pulley 4. The shield 17, mounted as it is, acts as a positive deterrent to such head movement of the chickens. With each movement of a chain-link connector 7 past the depending rod 25, the latter is shifted forwardly somewhat, as indicated in dotted lines in FIG. 3. Since this rod is rigid with the plate 16 and with the shield 17, these parts are swung as a unit about the hinge pin 14, and the shield 17 is lowered somewhat, the spring 20 becoming loaded with such swinging action. As soon as the rod 25 becomes released from the member 7 with the passage of the latter past said rod, the spring 20 acts to suddenly snap the rod 25 and shield 17 back to their initial position; the cushion pads 23 absorbing the noise otherwise had when the nuts 22 engage the pads. The rod 25 may, therefore, be considered as being a trigger, the lower portion of which comprises a sensor engageable with the chain-link connectors 7.

With this snapping-back movement of the shield, the head or bill of a chicken in the immediate vicinity is given a relatively light tap or poke in a backward direction, thus scaring it away from the adjacent head-catching zone. Also, the shield-feet 19, which depend into the feed in the trough as the shield is swung down, act to agitate the feed, break up any lumps therein, and maintain the feed at a proper level. Since the chain-link members 7 follow each other in relatively close order, the recurring swinging movements of the shield take place in rapid sequence, as will be evident, and this of course adds materially to the effectiveness of the chicken-deterring and feed-agitating action of the shield.

By reason of the adjustability of the rod 25, the distance said rod projects below the top level of chain members 7 may be varied. Such variation will obviously affect the arcuate length of the swinging stroke imparted to the guard 17, and the extent of its snap-back action. The sharpness or severity of such action may be varied to suit by adjusting the spring 20.

It is to be noted that the shield 17 is of relatively thin resilient material, so that as the shield snaps back to its normal position it will vibrate back and forth when the nuts 22 engage the pads 23. This will also tend to scare the chickens away from the immediate vicinity of the shield.

It will also be obvious that the guard unit is entirely self-contained, and may be quickly and easily mounted on or removed from the trough 2 merely by tightening or loosening the set screws 12a, and without having to make any changes or additions to the feeding device.

While the shield has here been described as being oscillated by the feed chain in the trough assembly, other means may be employed to attain the desired end.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention the following is claimed as new and useful, and upon which Letters Patent are desired:

1. A live poultry guard unit for a poultry feeding device and which device includes a feed-retaining trough section, and a housing at one end of the section through which the feed tends to move; said unit comprising a guard shield projecting into the trough section immediately ahead of the housing, means mounting the shield on the device for fore and aft swinging movement, and means included in part with the device and connected to the shield to recurringly oscillate the latter through an arc of limited length.

2. A live poultry guard unit for a poultry feeding device and which device includes a feed-retaining trough section, and a housing at one end of the section through which the feed tends to move; said unit comprising a guard shield projecting into the trough section immediately ahead of the housing, means mounting the shield on the device for fore and aft swinging movement, means included in part with the device and connected to the shield to recurringly swing the latter forwardly through a limited arc from a predetermined normal position, and means connected between the shield mounting means and the shield to return said shield to its normal position with a snap-action at the termination of each forward swing thereof.

3. A live poultry guard unit for a poultry feeding device and which device includes a feed-retaining trough section, a housing at one end of the section through which the feed tends to move, and a horizontal chain moving along the trough section below the feed level therein and into the housing, means mounting the shield in connection with and above the trough section for fore and aft swinging movement, chain actuated means to recurringly swing the shield forwardly through an arc of limited length from a predetermined initial position, and means to then return the shield to said initial position with a snap action after each forward movement thereof.

4. A live poultry guard unit for a poultry feeding device and which device includes a feed-retaining trough section, a housing at one end of the section through which the feed tends to move, and a horizontal chain moving along the trough section below the feed level therein and into the housing; the unit comprising a supporting bar mounted across and over the trough section in front of and adjacent the housing, a guard shield depending into the trough section rearwardly of the bar from above the same, means pivotally supporting the shield from the bar for fore and aft swinging movement, chain actuated means to recurringly swing the shield forwardly through an arc of limited length from a predetermined initial position, and means to then return the shield to said initial position with a snap action after each forward movement thereof.

5. A live poultry guard unit for a poultry feeding device and which device includes a feed-retaining trough section, a housing at one end of the section through which the feed tends to move, and a horizontal chain moving along the trough section below the feed level therein and into the housing, the chain including upstanding elements at intervals throughout its length; the unit comprising a supporting bar mounted across and over the trough section in front of and adjacent the housing, a guard shield depending into the trough section, means pivotally supporting the shield from the bar for fore and aft swinging movement, a member rigid with the shield ahead of the pivot means, a spring acting on the shield tending to swing the same rearwardly, and a rod rigid with and depending from the member into the trough in position for successive engagement at its lower end with the chain elements as the latter advances.

6. A live poultry guard unit for a poultry feeding device and which device includes a feed-retaining trough section, a housing at one end of the section through which the feed tends to move, and a horizontal chain moving along the trough section below the feed level therein and into the housing, the chain including upstanding elements at intervals throughout its length; the unit comprising a supporting bar mounted across and over the trough section in front of and adjacent the housing, a guard shield depending into the trough section, means pivotally supporting the shield from the bar for fore and aft swinging movement, a spring acting on the shield tending to swing the same rearwardly to a normal position, and a rod rigid with and depending from the shield supporting means for successive engagement at its lower end with the chain elements as the chain advances.

7. A unit, as in claim 2, in which the shield is a relatively thin plate of resilient material.

8. A live poultry guard unit for the feed-retaining trough section of a poultry feeding device and in which device the feed is maintained at a predetermined level in said trough section and is constantly conveyed toward one end thereof; the unit comprising a shield projecting into the trough section adjacent said end and to a normal level adjacent but above that of the feed, the width of the shield approaching that of the trough section, means included in part with the device and connected to the shield to recurringly swing said shield back and forth, and means mounting the shield on the device so that with such swinging, the shield will depend into the feed; the lower portion of the shield being cut away for a certain height between the side edges thereof whereby to provide spaced side feet to agitate said feed when the shield is thus swung, but without preventing the continued movement of the feed past the shield.

9. A live poultry guard unit for the feed-retaining trough section of a poultry feeding device and in which device the feed is maintained at a predetermined level in said trough section and is constantly conveyed toward one end thereof; the unit comprising a cross bar mounted across and resting on the trough section, a transverse hinge pin mounted on the bar, a rigid plate turnable on the pin, means applied to the plate to oscillate the same through an arc of limited extent, a shield of relatively thin resilient material secured at its forward end on the plate and shaped to arch thence over and clear of the cross bar and to then extend downwardly to a rearward termination at a level normally above but adjacent said feed level; the width of the shield approaching that of the trough section.

10. A guard mechanism for a conveyor feeder for animals having a conveying chain longitudinally movable through a feed trough and into a housing, comprising: a kicker member mounted on said feed trough for pivotal movement; and trigger means having a sensor portion engaging the links of said chain for reciprocal movement thereby as said chain moves, and an actuating connection to said kicker member for reciprocating said kicker member in unison with said sensor portion.

References Cited by the Examiner
UNITED STATES PATENTS

| | | | |
|---|---|---|---|
| 2,368,114 | 1/1945 | Cartlidge | 198—229 |
| 2,439,574 | 4/1948 | Mercier. | |
| 2,563,321 | 8/1951 | Dugan | 119—52 |
| 2,782,761 | 2/1957 | Martin et al. | 119—52 |
| 2,794,421 | 6/1957 | Rose et al. | 119—52 |
| 2,866,536 | 12/1958 | Smallegan | 119—52 |
| 2,932,382 | 4/1960 | James | 198—232 |

ALDRICH F. MEDBERY, *Acting Primary Examiner.*

SAMUEL KOREN, *Examiner.*